(12) United States Patent
Ranganathan et al.

(10) Patent No.: US 9,488,483 B2
(45) Date of Patent: Nov. 8, 2016

(54) LOCALIZATION USING ROAD MARKINGS

(71) Applicant: Honda Motor Co., Ltd., Minato-ku, Tokyo (JP)

(72) Inventors: Ananth Ranganathan, Santa Clara, CA (US); Tao Wu, Baltimore, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 13/896,827

(22) Filed: May 17, 2013

(65) Prior Publication Data

US 2014/0343842 A1 Nov. 20, 2014

(51) Int. Cl.
*G01C 21/28* (2006.01)
*G01C 21/30* (2006.01)

(52) U.S. Cl.
CPC ............... *G01C 21/30* (2013.01); *G01C 21/28* (2013.01)

(58) Field of Classification Search
CPC ................................. G01C 21/28; G01C 21/30
USPC .......................................................... 701/472
See application file for complete search history.

(56) References Cited

U.S. PATENT DOCUMENTS

| | | | |
|---|---|---|---|
| 5,638,116 A * | 6/1997 | Shimoura et al. | 348/118 |
| 5,937,079 A * | 8/1999 | Franke | G06K 9/209 348/E13.014 |
| 6,453,223 B1 | 9/2002 | Kelly et al. | |
| 6,516,267 B1 | 2/2003 | Cherveny et al. | |
| 6,591,000 B1 * | 7/2003 | Oike et al. | 382/104 |
| 6,801,244 B2 * | 10/2004 | Takeda et al. | 348/119 |
| 7,177,737 B2 | 2/2007 | Karlsson et al. | |
| 7,463,953 B1 | 12/2008 | Lee et al. | |
| 7,746,271 B2 | 6/2010 | Fürstenberg | |
| 7,774,158 B2 | 8/2010 | Goncalves et al. | |
| 8,036,427 B2 * | 10/2011 | Nakamori et al. | 382/104 |
| 8,169,309 B2 | 5/2012 | Asari | |
| 8,212,878 B2 * | 7/2012 | Shima et al. | 348/207.99 |
| 8,280,105 B2 * | 10/2012 | Kishikawa et al. | 382/103 |

(Continued)

FOREIGN PATENT DOCUMENTS

KR   20130034528 A  *  4/2013

OTHER PUBLICATIONS

Foucher et al., Detection and Recognition of Urban Road Markings Using Images, Oct. 2011, 2011 14th International IEEE Conference on Intelligent Transportation Systems (ITSC).*

(Continued)

*Primary Examiner* — John Q Nguyen
*Assistant Examiner* — Nadeem Odeh

(57) ABSTRACT

One or more embodiments of techniques or systems for creating a road marking classification template and vehicle localization using road markings are provided herein. A road marking classification template database includes templates of training images taken from different navigation environments. A training image with a road marking can be rectified and enhanced. Corners can be calculated for the road marking using the rectified or enhanced image. Locations can be determined for the corners and stored as part of a template. Similarly, a runtime image can also be rectified, enhanced, boosted, etc. Additionally, corners can be calculated for the runtime image and matched against corners of templates from the template database. A location or a pose of a vehicle can be determined using the match. In this way, vehicle localization is provided such that drift or other issues associated with GPS, such as occlusion, are mitigated, for example.

19 Claims, 16 Drawing Sheets

(56) References Cited

U.S. PATENT DOCUMENTS

| | | | |
|---|---|---|---|
| 8,301,374 | B2 | 10/2012 | Surampudi et al. |
| 8,346,473 | B2 | 1/2013 | Nakamura et al. |
| 8,352,111 | B2 | 1/2013 | Mudalige |
| 8,699,754 | B2* | 4/2014 | Zhang et al. ............... 382/104 |
| 2005/0002558 | A1* | 1/2005 | Franke et al. ............... 382/154 |
| 2007/0055441 | A1 | 3/2007 | Retterath et al. |
| 2009/0088978 | A1* | 4/2009 | Ishikawa et al. ............ 701/223 |
| 2009/0228204 | A1 | 9/2009 | Zavoli et al. |
| 2010/0256835 | A1 | 10/2010 | Mudalige |
| 2010/0310159 | A1* | 12/2010 | Ranganathan ............... 382/161 |
| 2011/0006914 | A1 | 1/2011 | Tsuda |
| 2012/0013713 | A1* | 1/2012 | Sumitomo ..................... 348/46 |
| 2012/0035844 | A1 | 2/2012 | Ono |
| 2012/0050489 | A1* | 3/2012 | Gupta et al. ................... 348/46 |
| 2012/0269382 | A1 | 10/2012 | Kiyohara et al. |
| 2012/0310516 | A1 | 12/2012 | Zeng |
| 2014/0003709 | A1* | 1/2014 | Ranganathan et al. ....... 382/159 |

OTHER PUBLICATIONS

Unknown, Region Detectors, 2011 (see weblink below), University of Florence Course Lecture Notes <http://www.micc.unifi.it/delbimbo/wp-content/uploads/2011/03/slide_corso/A34%20MSER.pdf>.*

Rosten et al., Faster and Better: A Machine Learning Approach to Corner Detection, Jan. 2010, IEEE Transactions on Pattern Analysis and Machine Intelligence, vol. 32, No. 1.*

McCall et al., Video-Based Lane Estimation and Tracking for Driver Assistance: Survey, System, and Evaluation, Mar. 2006, IEEE Transactions on Intelligent Transportation Systems, vol. 7, No. 1.*

Rosten et al., Real-Time Video Annotations for Augmented Reality, 2005, Lecture Notes in Computer Science.*

Broggi et al., Automatic Vehicle Guidance: The Experience of the ARGO Autonomous Vehicle,1999, World Scientific, pp. 96, 108.*

Frank, Road Markings Recognition, 1996, IEEE.*

Kurdziel, A Monocular Color Vision System for Road Intersection Detection, 2008, Rochester Institute of Technology.*

Matas et al., Robust Wide Baseline Stereo from Maximally Stable Extremal Regions, 2002, Proceedings of the British Machine Vision Conference.*

English Machine Translation: Lee Jun Seok, Korean Patent Publication KR 20130034528 A, Korean Patent Office.*

Pichumani, Snake: an active model, Jul. 1997, The University of Edinburgh <http://homepages.inf.ed.ac.uk/rbf/CVonline/LOCAL_COPIES/RAMANI1/node31.html>.*

Wu et al. A Practical System for Road Marking Detection and Recognition. IEEE Intelligent Vehicles Symposium (IV), 2012. retrieved on [Nov. 9, 2014]. retrieved from IEEE <URL: http://ieeexplore.ieee.org/stamp/stamp.jsp?arnumber=6232144> pp. 25-30.

Kass et al. Snakes: Active Contour Models. International Journal of Computer Vision 1988. retrieved on [Nov. 9, 2014]. retrieved from the internet <URL: http://ww.vavlab.ee.boun.edu.tr/courses/574/material/Variational Image Segmentation/kaas_snakes.pdf> pp. 321-331.

Patent Cooperation Treaty, International Search Report, Mailed on Sep. 30, 2014.

* cited by examiner

LOCALIZATION USING ROAD MARKINGS

BACKGROUND

Generally, localization for a vehicle is accomplished by using a global positioning system (GPS). For example, GPS is a space based satellite navigation system that is capable of determining a location based on multiple GPS satellites, so long as there is an unobstructed view to the GPS satellites. However, GPS units are generally accurate to the order of about ten meters, which is not sufficient for lane level localization. Often, GPS units suffer from drift as a result of accumulation or compounding of errors. Additionally, because GPS requires an unobstructed view to GPS satellites, inclement weather conditions, urban regions, mountainous terrain, or other occlusions often pose challenges to vehicle localization.

SUMMARY

This summary is provided to introduce a selection of concepts in a simplified form that are described below in the detailed description. This summary is not intended to be an extensive overview of the claimed subject matter, identify key factors or essential features of the claimed subject matter, nor is it intended to be used to limit the scope of the claimed subject matter.

One or more embodiments of techniques or systems for vehicle localization using road markings are provided herein. As an example, an image capture device or camera can be used to capture images which are then compared to templates, thereby enabling one to determine their location. In one or more embodiments, a camera is mounted to a car to capture images to be compared to database images in order to determine a location for the car. In one or more embodiments, a cell phone camera can be used to capture images, which are compared to images in a database to determine a location for the cell phone. Processing, such as performing a bird's-eye-view transform on a capture image can occur prior to database comparison. Road markings generally include markings associated with an absolute position, such as markings painted on or placed upon a road surface, turn arrows, pedestrian crossings, crosswalks, speed limits, bike lane markings, other postings, etc. Location information, features or data pertaining to these road markings can be surveyed and compiled into a template of a database, such as a road marking classification template or template for a template database including one or more templates. A template can represent a location, such as a GPS location and be used to identify the location based on features, such as corners stored within the template. As used herein, a corner is generally associated with corner detection, such as an approach used within computer vision systems to extract features or infer the contents of an image. Because road markings are generally associated with an absolute position, accumulation of error and drift can be mitigated and accuracy of localization improved. Additionally, a road marking detection component, such as one or more cameras or one or more image capture devices, can be used to gather or capture images, such as runtime images of a navigation environment of a vehicle. The template database or system may then be used to facilitate vehicle localization or determine a pose of a vehicle by comparing runtime image(s) to training image(s) from the template database. According to one or more aspects, the pose of the vehicle can include a bearing in which the vehicle is facing.

As an example, when a training image of a navigation environment including one or more road markings is received (e.g., from a camera), the training image can be rectified to mitigate perspective distortion, lens distortion, or other distortion, etc. In other words, the training image can be transformed such that the perspective may be similar to a bird's-eye-view of the navigation environment. The rectified training image can have a bird's-eye-view of the road markings. A bounding box, region, or other delegator can be assigned or created around a road marking within the rectified training image to identify or highlight the road marking. Additionally, portions of the rectified training image within the bounding box can be enhanced to segment or distinguish the road marking from the remainder of the rectified training image. One or more corners can be calculated or computed for the road marking within the bounding box. Corners can be found or calculated in corner detection in association with computer vision systems to extract features or infer contents of an image. For example, a corner generally has a well-defined position and can be robustly detected. In other words, a corner can be a detected portion of a road marking, which has an absolute location associated therewith, and used for localization herein.

Additionally, corners can be associated with one or more locations, such as a GPS location (e.g., based on a GPS coordinate system) or a pixel location (e.g., based on a pixel coordinate system). To this end, a template for the training image can be created or stored, where the template includes the corners and associated locations or coordinates (e.g., based on different coordinate systems). Because a template can be feature based or includes multiple features, multiple corners, etc., comparison or matching possibilities are improved. That is, if one or more features are not detected at runtime (prior to localization), matching, and thus localization may still be possible.

When a vehicle is outfitted with a road marking sensor, such as a camera, the camera can take a runtime image of a navigation environment and compare aspects or features, such as corners, of the runtime image with corners from templates of a template database. For example, a runtime image can be received and transformed or rectified in a similar manner as the training image. In one or more embodiments, shadow boosting and image enhancement techniques can be used to prepare an image for corner detection or corner calculation. After corners are calculated, the corners can be classified, such as by road marking type, for example. The corners can be matched against templates from the template database, and a location for the vehicle or a pose for the vehicle can be determined accordingly. Because pixel locations for road markings, GPS locations of the road markings can be determined from the matched template, a pixel location of the camera can be determined from the runtime image, and a height of the camera on the vehicle is known, the location and pose of the vehicle can be determined by mapping from the pixel coordinate system to the GPS coordinate system. Additionally, navigation instructions can be provided based on the location of the vehicle, the pose of the vehicle, one or more or the road markings, etc.

It will be appreciated that while a boundary, such as a "bounding box", is described herein, it is understood that other shapes can be employed without departing from the spirit or scope of the disclosure.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
FIG. 1 is an illustration of an example training image of a navigation environment for a template, according to one or more embodiments.

Embodiments or examples, illustrated in the drawings are disclosed below using specific language. It will nevertheless be understood that the embodiments or examples are not intended to be limiting. Alterations and modifications in the disclosed embodiments, and further applications of the principles disclosed in this document are contemplated as would normally occur to one of ordinary skill in the pertinent art.

It will be appreciated that for one or more of the figures herein, one or more boundaries, such as boundary 110 or 120 of FIG. 1, for example, are drawn with different heights, widths, perimeters, aspect ratios, shapes, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component, feature, marking, etc. in one or more instances. Conversely, a drawn box does not necessarily encompass merely an associated component, feature, marking, etc., in one or more instances, but encompasses at least a portion of one or more other component, feature, marking, etc. as well. Additionally, it will be appreciated that a component, feature, marking, etc. may be encompassed by a dashed line or dotted line merely for identification, such as 110 or 120 of FIG. 1, for example.

Generally, vehicle localization is achieved by a global positioning system (GPS), which is a space based satellite navigation system that enables one to determine a current location based on an unobstructed line of sight to multiple GPS satellites. A GPS receiver can calculate an associated location based on a timing of a signal and positions of GPS satellites during signal transmission. However, GPS can be inaccurate due to drift or satellite occlusion. In one or more embodiments, vehicle localization can be achieved by surveying or receiving training images of road markings, storing associated feature information in a template database of one or more training templates or templates, and comparing a runtime image with corresponding training images from templates of the template database. As an example, a template can include a rectified training image (e.g., or other images derived therefrom, such as boosted images, enhanced images, etc.) derived from a training image. Further, the template can include one or more corners that are based on road markings within the training image and the rectification or bird's-eye-view transform performed on the training image. One or more corresponding locations associated with the corners can be determined and stored as part of the template. For example, a corner of a road marking within a rectified training image can be associated with a GPS location and a pixel location. The GPS location corresponds to a GPS coordinate system in the real world, while the pixel location corresponds to a pixel coordinate system within the rectified training image.

FIG. 1-FIG. 4 are illustrations of example training images and transformations or enhancements applied to a training image during processing, formation, or creation of a template.

FIG. 1 is an illustration of an example training image 100 of a navigation environment for a template, according to one or more embodiments. Generally, a road marking detection component, such as a camera, a mono camera, a set of stereo cameras, an image capture device, a camera or an image capture component on a mobile device, or other type of sensor(s), etc., can be mounted to a vehicle and configured to capture or receive one or more training images of a navigation environment through which the vehicle is travelling. Generally, features captured within the training image can be used to facilitate vehicle localization. For example, one or more of the features can include road markings, corners derived therefrom, or other indicia. Road markings can be used for vehicle localization because they are often designed to be conspicuous, are generally stationary, and often substantially white in color. In this way, the absolute location associated with road markings can be used for vehicle localization, such as when GPS satellites are obscured from view. In one or more embodiments, a training image of a navigation environment can be received, where the training image may be associated with a perspective from a vehicle due to a mounting of a camera on a vehicle, for example. Additionally, the training image can include one or more road markings or one or more 'training' road markings.

A road marking may include, but is not limited to markings painted or placed upon on a road surface, turn arrows, pedestrian signs, crosswalks, speed limits, lane markings, bike markings, other traffic postings, etc. Additionally, a "road marking", as used herein may include shapes, words, or other indicia, or combination thereof. Because a road marking detection component or camera may be mounted to face a same direction as a driver of the vehicle, the training image 100 may be associated with a perspective or first person view. The training image 100 of FIG. 1 includes one or more (training) road markings, indicated at 110 and 120, for example. In this example, 110 is a first railroad crossing road marking and 120 is a second railroad crossing road marking.

Figure 2:
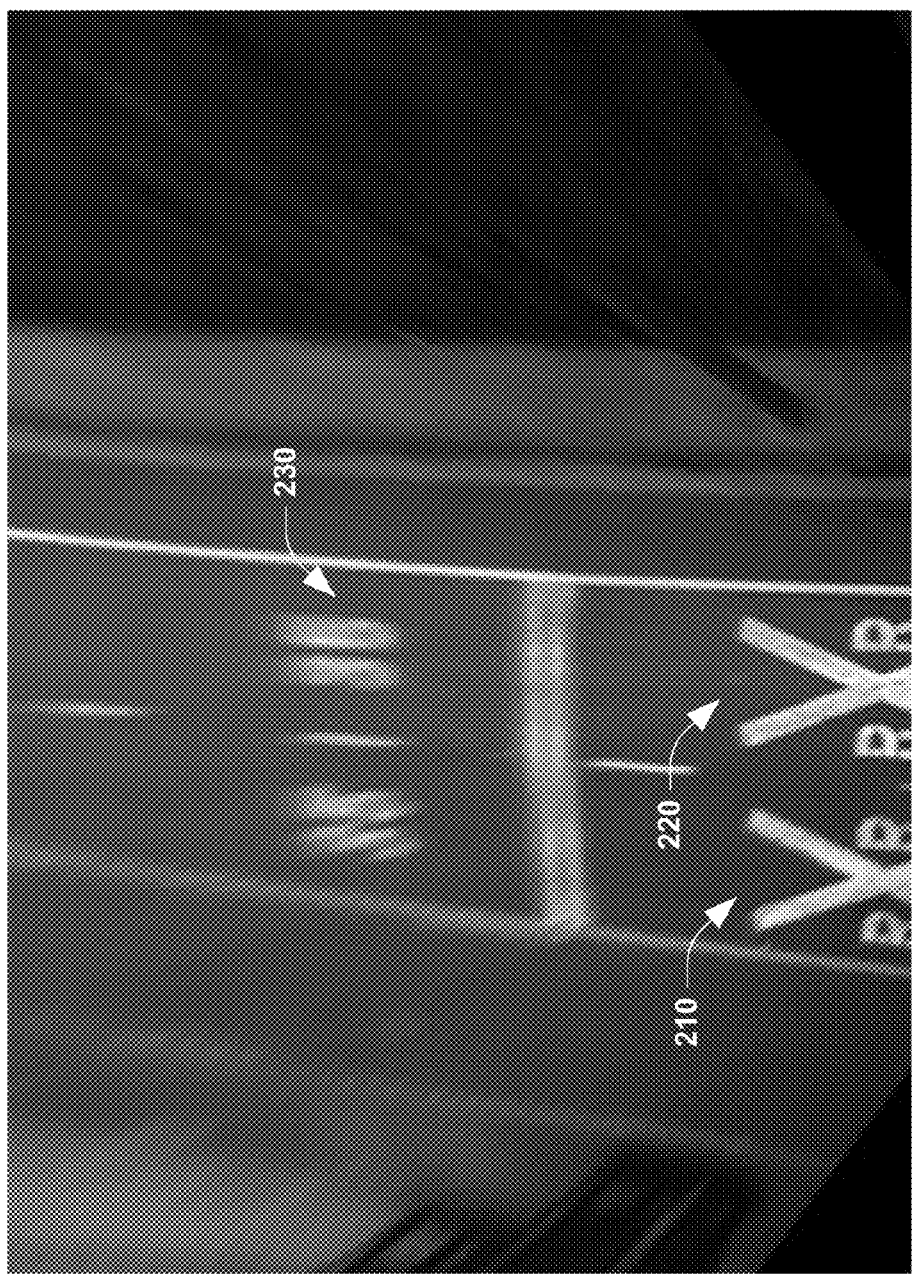
FIG. 2 is an illustration of an example rectified training image of a navigation environment for a template, according to one or more embodiments.

FIG. 2 is an illustration of an example rectified training image 200 of a navigation environment for a template, according to one or more embodiments. In one or more embodiments, the training image 100 of FIG. 1 can be transformed or rectified into a rectified training image 200 by reducing, mitigating, compensating for, or removing at least one of perspective distortion or lens distortion associated with the training image 100 of FIG. 1. In other words, the training image 100 of FIG. 1 can be effectively transformed from a perspective view of a navigation environment to a bird's-eye-view of the navigation environment. As a result of this transformation or rectification, the training image 100 of FIG. 1 may appear to be 3-D or three dimensional, while the rectified training image 200 may appear to be 2-D or two dimensional. In one or more embodiments, an image processing component can be configured to transform a training image 100 into a rectified training image 200 by reducing perspective distortion associated with the training image 100, where the rectified training image 200 includes a rectified view 210, 220 of the one or more road markings or the one or more training road markings. Accordingly, the rectified training image 200 includes a rectified view of the first railroad crossing road marking 110 and the second railroad crossing road marking 120, as indicated at 210 and 220, respectively. Because perspective distortion or lens distortion can be reduced, compensated for, or removed by applying the bird's-eye-view transform or rectifying the training image 100, vehicle localization may be more accurately determined when using features from the rectified training image 200, such as aspects associated with at least one of the first railroad crossing road marking 210, the second railroad crossing road marking 220, or a speed limit road marking 230 (not visible or labeled in FIG. 1).

In one or more embodiments, the rectified training image 200 can be derived from the training image 100 in FIG. 1 by applying an inverse perspective transform on the training image 100. The inverse perspective transform may be based on at least one of a height or an angle of at least one of a road marking detection component, camera, or sensor with respect to a ground plane of the vehicle. When the height of the camera, the angle of the camera, and GPS coordinates of the camera are known, distances or real world locations, such as GPS coordinates, can be determined for one or more pixels of the rectified training image 200. In other words, a pixel of the rectified training image 200 can be associated with a distance in the real world or assigned a set of GPS coordinates based on the height of the camera, the angle of the camera, or GPS coordinates of the camera. Additionally, a tilt angle of a ground plane associated with the vehicle can be measured, according to one or more embodiments. When a vehicle is travelling or resting on a ground plane that is not flat, such as a hill, rectification of the training image may be adjusted based on the tilt angle of the ground plane accordingly. For example, a gyroscope component can be configured to measure the tilt angle of the ground plane for the vehicle. Additionally, an image processing component can be configured to transform a training image into a rectified training image based on the tilt angle of the ground plane.

Figure 3:
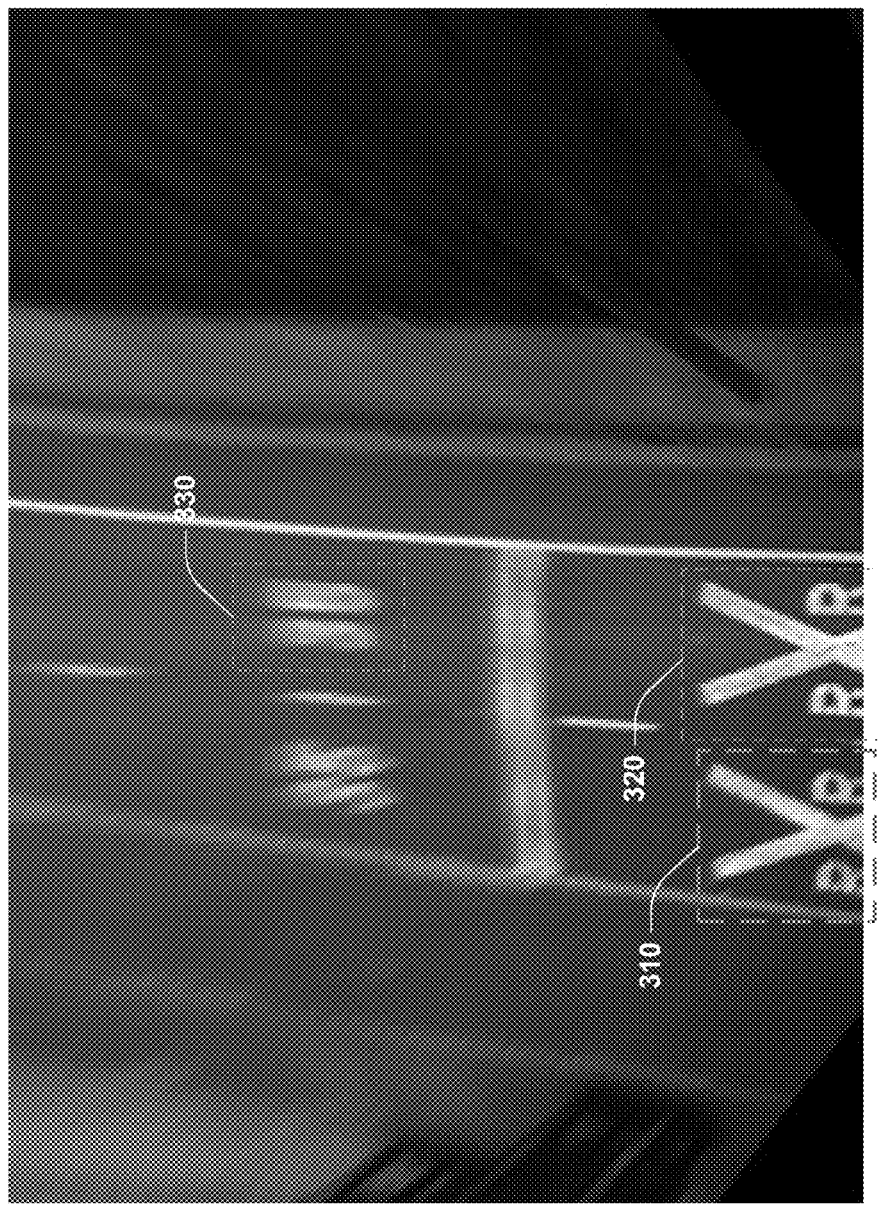
FIG. 3 is an illustration of example bounding boxes within a rectified training image of a navigation environment, according to one or more embodiments.

FIG. 3 is an illustration of example bounding boxes within a rectified training image 300 of a navigation environment, according to one or more embodiments. In one or more embodiments, a bounding box can be a region that defines a corresponding road marking region can be assigned to a road marking within a rectified training image 300. In one or more embodiments, a bounding box component or an image processing component can be configured to assign a bounding box to a corresponding road marking region. The rectified training image 300 of FIG. 3 is similar to the rectified training image 200 of FIG. 2, except that the rectified training image 300 of FIG. 3 includes one or more bounding boxes 310, 320, and 330 assigned to the first railroad crossing road marking 210, the second railroad crossing road marking 220, and the speed limit road marking 230 of FIG. 2, respectively. In one or more embodiments, a bounding box can be a box or enclosed loop used to identify a road marking or define a road marking region associated with the road marking. As an example, a first bounding box 310 can be associated with a first road marking region within the first bounding box 310, which includes the first railroad crossing road marking 210 of FIG. 2. Similarly, a second bounding box 320 can be associated with a second road marking region within the second bounding box 320, which includes the second railroad crossing road marking 220 of FIG. 2. Additionally, a third bounding box 330 can be associated with a third road marking region within the third bounding box 330, which includes the speed limit road marking 230 of FIG. 2. A bounding box effectively identifies a region of interest or road marking region and enables a localization system, etc. to enhance the road marking region and further calculate information, such as corners, to facilitate a more accurate localization for a vehicle.

In one or more embodiments, image enhancement can be performed on the rectified training image 300. For example, image enhancement (not shown) can be performed on one or more road marking regions associated with the first bounding box 310, the second bounding box 320, or the third bounding box 330. A region extraction algorithm, such as a maximally stable external regions (MSER) algorithm can be used to extract or segment a road marking or a road marking region from the rectified training image 300. By performing image enhancement, such as MSER, on the rectified training image 300, road marking features can be highlighted, thereby facilitating identification of the road marking features for storage within a road marking classification template or "template", for example. The MSER algorithm effectively transforms an input image, such as a road marking portion of the rectified training image 300 into a binary image. For example, image enhancement can be used to transform an image or portions of an image from color or grayscale to black and white, thereby highlighting one or more road markings for corner detection, computation, or calculation and storage, as will be described herein. In one or more embodiments, an image enhancement component can be configured to perform the image enhancement, such as by applying the MSER transformation on an image, such as the rectified training image 300.

Figure 4:
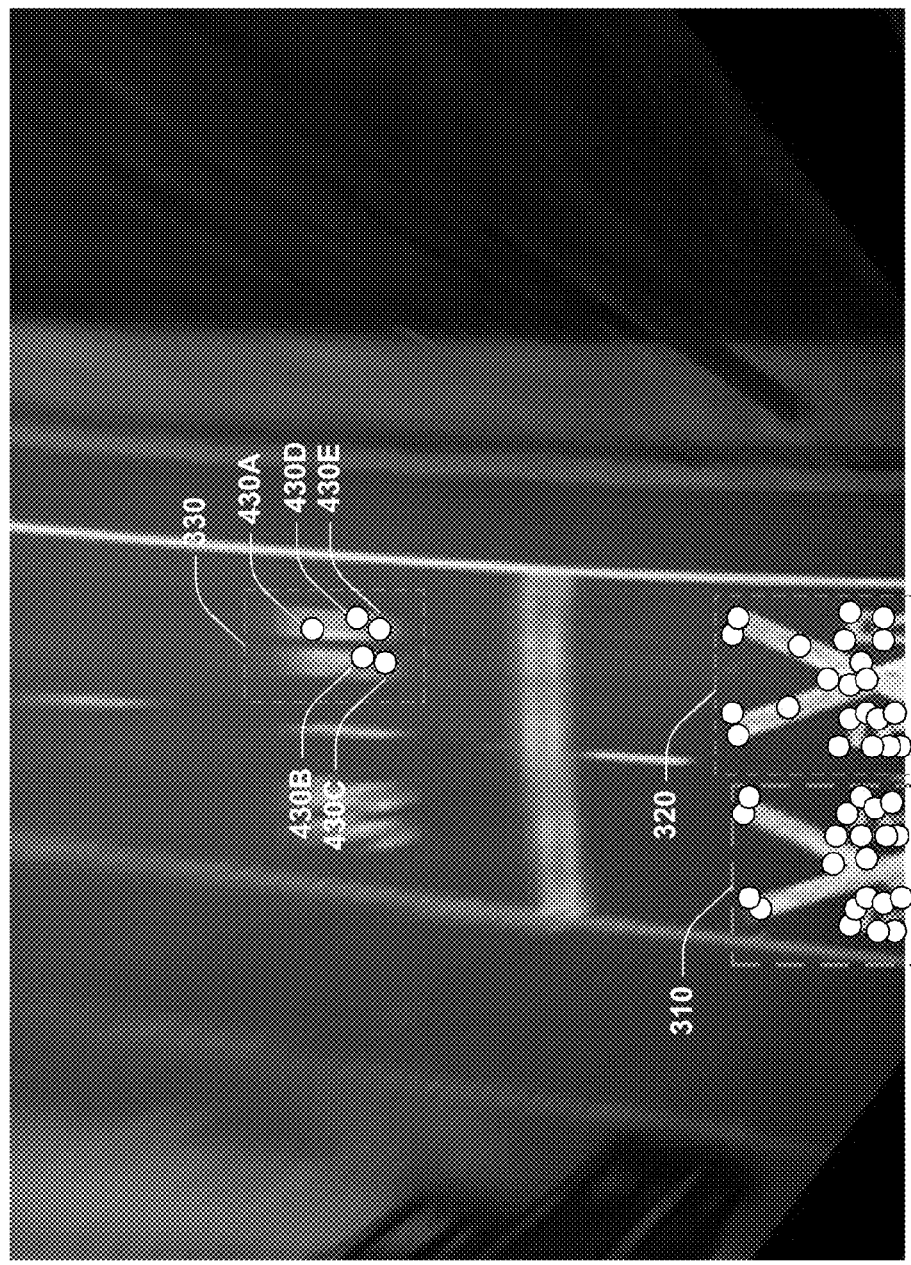
FIG. 4 is an illustration of example corners within a rectified training image of a navigation environment, according to one or more embodiments.

FIG. 4 is an illustration of example corners within a rectified training image 400 of a navigation environment, according to one or more embodiments. In one or more embodiments, the first railroad crossing road marking 210, the second railroad crossing road marking 220, and the speed limit road marking 230 identified in FIG. 2 may be highlighted or segmented by the first bounding box 310, the second bounding box 320, and the third bounding box 330, respectively. One or more template corners can be calculated or computed for the respective road markings 210, 220, and 230 within bounding boxes 310, 320, and 330. In FIG. 4, five corners 430A, 430B, 430C, 430D, and 430E can be calculated or detected for the speed limit posting 230 associated with bounding box 330. Similarly, other corners (not labeled) can be calculated or detected for other road markings associated with other bounding boxes, such as the first bounding box 310 and the second bounding box 320.

Generally, corner detection can be used to extract features and infer contents of an image. A corner often has a well-defined position (e.g., physical or GPS location based on a real world coordinate system) and can be robustly detected. Because of this, a corner can be a representation of a detection portion of a road marking, and can be considered a reliable location indicator for vehicle localization. In other words, corner detection or calculation can enable a vehicle localization system to translate markings associated with an absolute location, such as road markings, from the real world to a template, by associating or outlining a set of points or pixels within an image with pixel coordinates (e.g., based on a pixel coordinate system), for example. Accordingly, a pixel location within a rectified training image 400 can be determined for a corner, because a corner can be a pixel within the rectified training image 400 (e.g., a template corner). In one or more embodiments, one or more template corners can be calculated for one or more of the road markings based on corresponding bounding boxes for the respective road markings. In other embodiments, one or more template corners can be calculated for one or more of the road markings based on enhanced training road marking regions, such as an MSER enhanced road marking region. In one or more embodiments, one or more template corners can be based on features from accelerated segment test (FAST) corner detection. In one or more embodiments, a corner component can be configured to calculate one or more corners or template corners for one or more road markings or one or more training road markings based on one or more road marking regions, enhanced road marking regions within bounding boxes, such as bounding box 310, 320, or 330. Additionally, the corner component can be configured to compute FAST corners based on FAST corner detection.

It will be appreciated that an image, such as the rectified training image 400 of FIG. 4 can include one or more pixels. In one or more embodiments, each pixel can be associated with a set of pixel coordinates (e.g., [0, 0], [0, 1], etc.). For example, corners 430A, 430B, 430C, 430D, and 430E within the third bounding box 330 can be associated with a set of pixel coordinates that are unique from one another within an image. In one or more embodiments, a corner can be associated with a patch of surrounding pixels. Descriptors can be calculated based on the patch of pixels. In the following example, a corner pixel is in a center of a 5×5 patch of pixels, where C=a corner or a corner pixel and X=other pixels:
XXXXX
XXXXX
XXCXX
XXXXX
XXXXX In one or more embodiments one or more descriptors can be calculated for a corner based on the patch of surrounding pixels. For example, a histogram of oriented gradients (HOG) descriptor (not shown in FIG. 4) can be calculated and stored along with the pixel coordinate information. Generally, a HOG descriptor is a feature descriptor, and can be used in computer vision and image processing for object detection. A number of occurrences of a gradient orientation in a portion of an image can be determined. Due to variations in lighting or scale, a HOG descriptor comparison (e.g., between images) may offer improved accuracy for object detection over direct pixel comparison between a runtime image and a training image, for example. It will be appreciated that a size or set of dimensions associated with a patch of pixels can vary or be adjusted. For example, a 3×3 patch or a 7×7 patch may be used in other embodiments. It will be appreciated that a corner pixel may not always necessarily be at the center of a patch, such as when a corner pixel is at an edge of a rectified image or rectified training image, for example.

In one or more embodiments, each pixel can be associated with a set of physical coordinates, such as GPS coordinates, in addition to the set of pixel coordinates. In other words, pixels can referenced 'on paper' (e.g., within a rectified image or rectified training image) using a first set of coordinates, such as the pixel coordinate system, and also referenced 'in the real world' (e.g., representing a physical distance, etc.) using a second set of coordinates, such as a GPS coordinate system. In one or more embodiments, a GPS component can determine a location for a road marking detection component, such as a camera or image capture device, configured to capture or receive a training image, such as the training image 100 of FIG. 1. Based on at least one of an angle, a height, or other position, etc. of at least one of the camera or road marking detection component, one or more GPS coordinates can be determined for the corners 430A, 430B, 430C, 430D, and 430E calculated within the rectified training image 400 of FIG. 4. In one or more embodiments, a GPS component can be placed physically at a corner to determine a GPS location or set of GPS coordinates for the corner. In other embodiments, the GPS component or a corner component can calculate the GPS location for a corner using variables, such as the height or angle of the camera in conjunction with the GPS location of the camera, or other methods, such as triangulation, etc.

Corners or associated corner pixels (e.g., template corners) from a training image can thus be associated with coordinates from multiple coordinate systems. When corners from a runtime image (e.g., runtime corners) are compared with corners from a training image (e.g., template corners), as will be described herein, a GPS coordinate can be determined for a camera capturing the runtime image based on pixel locations of template corners, GPS locations of template corners, pixel locations of runtime corners, and a pixel location of the camera from the runtime image. In other words, the location for the camera can be determined by mapping pixel locations of matching corners from a runtime image and a training image to GPS locations or coordinates. In one or more embodiments, this mapping can be based on FAST corners calculated for a rectified runtime image and a rectified training image. Additionally, the mapping can be based on HOG descriptors calculated from a patch of pixels, where the patch of pixels includes a corner pixel. In one or more embodiments, a corner component can be configured to determine a patch of pixels for a corner and calculate a corresponding HOG descriptor for the corner.

In one or more embodiments, a set of corners corresponding to a road marking, a road marking region, or a bounding box can be classified, such as by being manually labeled with a classification (e.g., a road marking labeled as a railroad crossing, etc.).

In one or more embodiments, a template can be created by storing one or more of the corners, corresponding locations, such as GPS locations, GPS coordinates, pixel locations, pixel coordinates, and descriptors, such as HOG descriptors. In other words, the template can be learned from a training image, a rectified training image, one or more associated template corners of an image, bounding boxes, etc. A template can include a training image, one or more corners calculated or detected within the training image, GPS locations for the corners, pixel locations for the corners, and HOG descriptors for the corners. For example, the templates can be stored in a template database. It will be appreciated that the template database can be a local database, a remote database, stored on memory, such as flash memory, etc.

Figure 5:
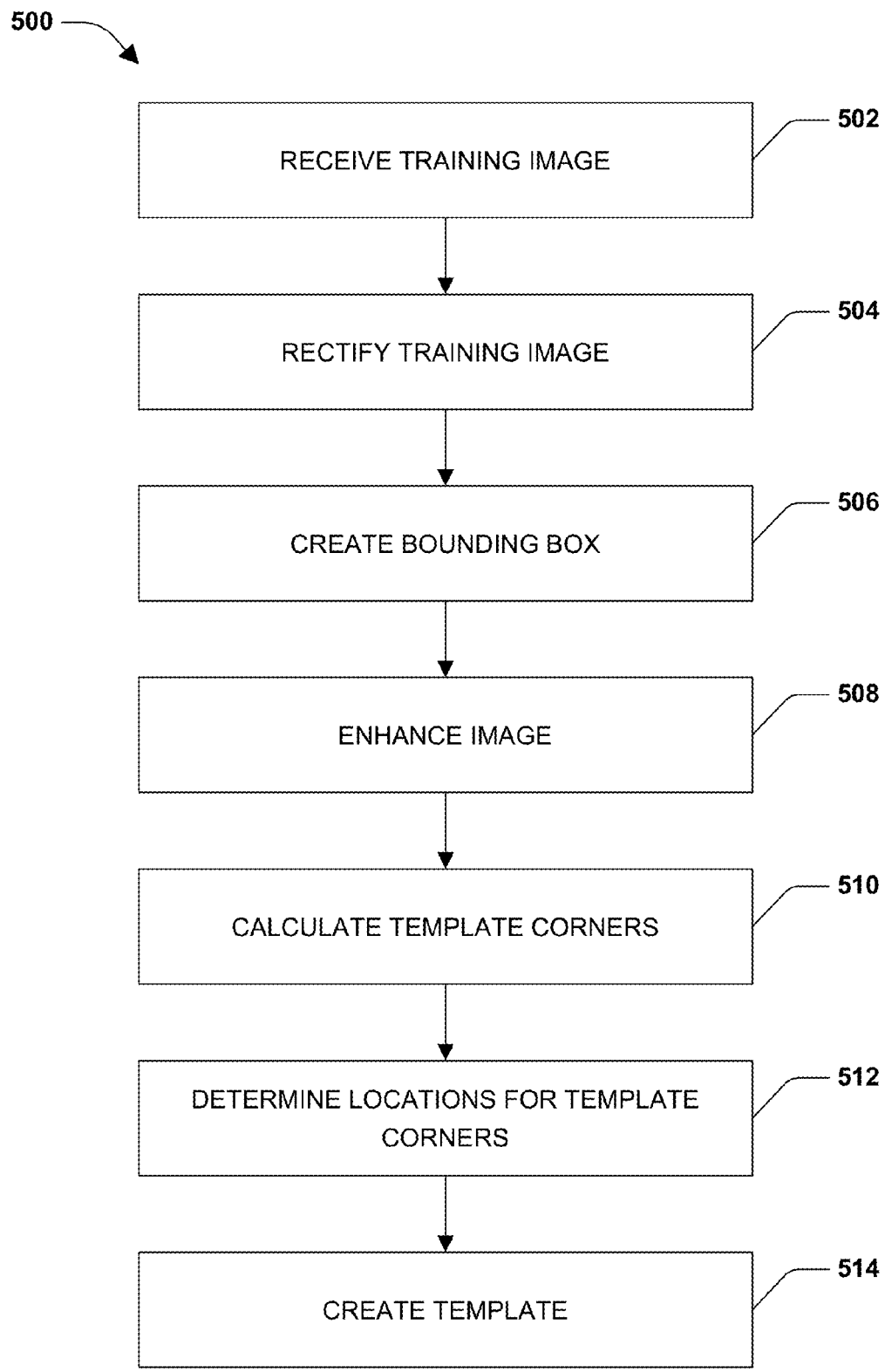
FIG. 5 is a flow diagram of a method for creating a template, according to one or more embodiments.

FIG. 5 is a flow diagram of a method 500 for creating a template, according to one or more embodiments. At 502, a training image can be received or captured. At 504, the training image can be transformed or rectified such that distortion (e.g., lens distortion or perspective distortion) is mitigated or removed. At 506, a bounding box or other region can be created or assigned to a road marking within the rectified training image. At 508, a portion of the image, such as the portion within the bounding box or a road marking region can be enhanced, such as by applying MSER to the road marking region. At 510, one or more template corners can be calculated for the road marking within the bounding box or road marking region. At 512, one or more locations can be determined for one or more template corners. For example, one or more GPS locations can be determined. Additionally one or more pixel locations can be determined for one or more corners. At 514, a template can be stored or created for the training image, where the template can include the training image, one or more of the corners, one or more GPS locations for the corners, one or more pixel locations for the corners, and one or more descriptors for the corners, such as HOG descriptors. In one or more embodiments, one or more templates can be created for various navigation environments across different conditions (e.g., different views, camera angles, camera heights, road conditions, weather conditions, time of day when a training image is captured or received, etc.).

Figure 6:
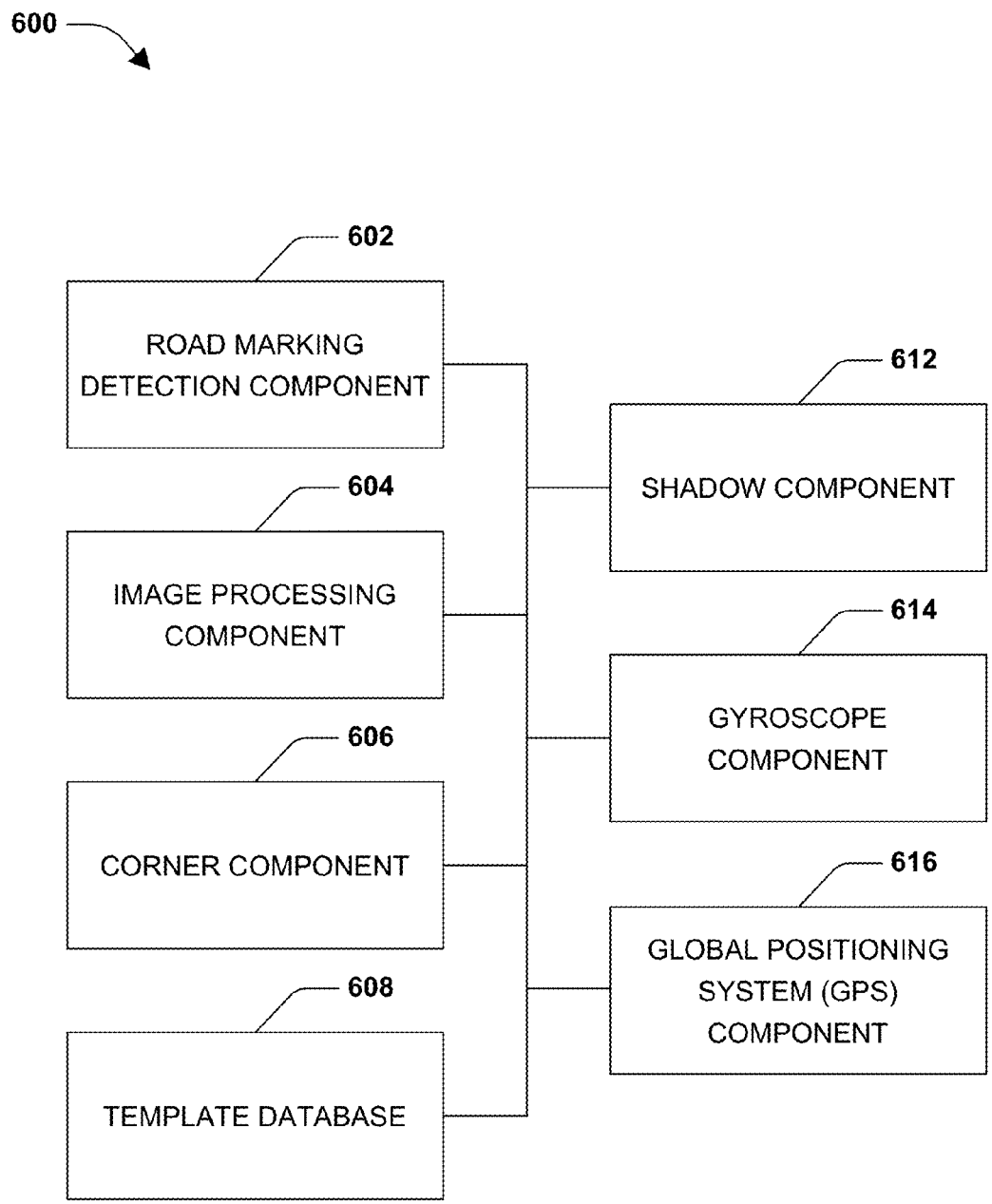
FIG. 6 is a component diagram of a system for creating templates, according to one or more embodiments.

FIG. 6 is a component diagram of a system 600 for creating templates, according to one or more embodiments. A road marking detection component 602 can be configured to capture or receive a training image. An image processing component 604 can be configured to process, rectify, or transform the training image into a rectified training image. Additionally, the image processing component 604 can be configured to assign or create a bounding box for a road marking within the training image. Further, the image processing component 604 can be configured to enhance a portion of the training image, such as a road marking region associated or defined by the bounding box. A corner component 606 can be configured to calculate one or more corners for the road marking region based on the road marking region or the bounding box. In one or more embodiments, a GPS component 616 can be configured to determine a GPS location of the road marking detection component 602. Further, the GPS component 616 can be configured to determine GPS locations or GPS coordinates for one or more of the corners calculated by the corner component 606. A shadow component 612 can be configured to perform shadow boosting, as will be described in more detail herein, on at least a portion of the rectified training image. A gyroscope component 614 can be configured to measure a tilt angle of a ground plane associated with the vehicle and the image processing component 604 can further be configured to transform a training image into a rectified training image based on the tilt angle of the ground plane. The corner component 606 can be configured to create a template and store one or more templates in a template database 608. The template database 608 can include one or more templates. A template of the template database 608 can correspond to a training image (e.g., of a navigation environment) and aspects associated therewith, such as corners, locations, GPS locations, pixel locations, descriptors, etc.

In one or more embodiments, a mobile device, such as a smartphone can be equipped with an application configured to utilize a camera of the smartphone to capture images for use as a runtime image, thereby enabling the smartphone to be used for localization. The mobile device can be mounted to a vehicle, such as a bicycle, or held by a user during capture of a runtime image, for example.

FIG. 7-FIG. 11 are illustrations of example runtime images and transformations or enhancements applied to a runtime image during localization.

Figure 7:
FIG. 7 is an illustration of an example runtime image of a navigation environment, according to one or more embodiments.

FIG. 7 is an illustration of an example runtime image 700 of a navigation environment, according to one or more embodiments. In FIG. 7, a runtime image 700 is captured or received, and includes one or more runtime road markings (e.g., road markings captured or received at runtime) or road markings. The runtime image 700 includes a first railroad crossing road marking 710 and a second railroad crossing road marking 720, similar to 110 and 120 of FIG. 1, respectively. However, the runtime image 700 of FIG. 7 is captured at runtime, when a location of a vehicle is to be determined, while the training image 100 of FIG. 1 is captured during creation of a template or training template, when a location of a vehicle is known. Accordingly, it will be appreciated that a runtime road marking can be the same road marking as a road marking detected in a training image or the training road marking. In other words, a training road marking detected during creation of a template or a template database can be the same as a runtime road marking detected during vehicle localization and referred to as a 'road marking' herein. Additionally, a template corner calculated during creation of a template or a template database can correspond to a runtime corner calculated during vehicle localization. It will be appreciated that a training image can be captured during template creation, while a runtime image is generally captured at runtime or during vehicle localization, etc.

Accordingly, it will be appreciated that 'training' or 'template' may associate a term with template creation, while 'runtime' may reference a term during vehicle localization, according to one or more embodiments.

In one or more embodiments, a road marking detection component can be configured to receive a runtime image of a navigation environment associated with a perspective from a vehicle, where the runtime image can include one or more runtime road markings or road markings. The runtime image is captured as a point of comparison against (training images of) templates of a template database to find a match, and thereby facilitate vehicle localization. As an example, a GPS receiver can be a primary localization system and a vehicle localization system using road markings can supplement the GPS receiver with localization information. Alternatively, the vehicle localization system based on or augmented with road markings can be a standalone GPS system in other embodiments.

Figure 8:
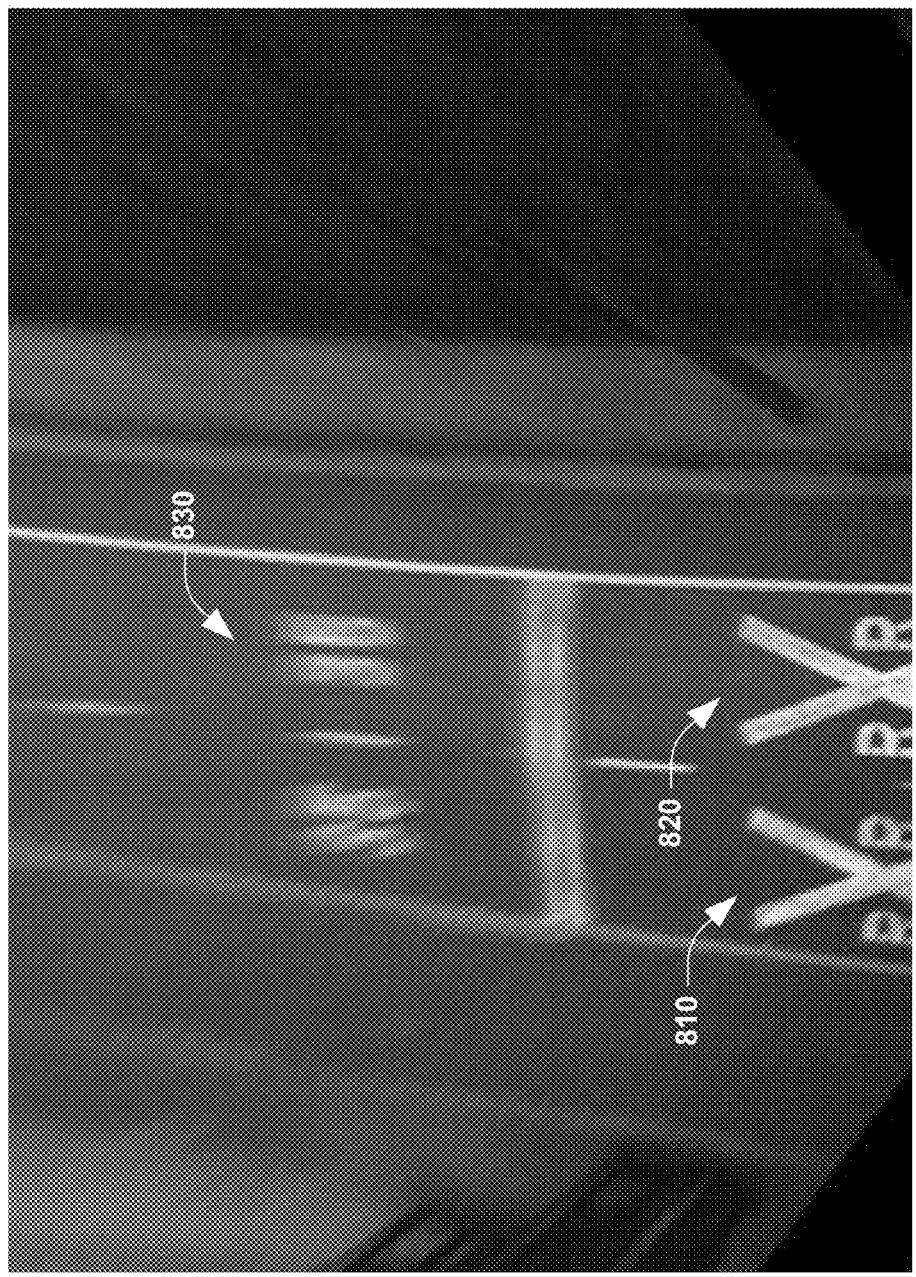
FIG. 8 is an illustration of an example rectified runtime image of a navigation environment, according to one or more embodiments.

FIG. 8 is an illustration of an example rectified runtime image 800 of a navigation environment, according to one or more embodiments. The rectified runtime image 800 of FIG. 8 is derived or transformed from the runtime image 700 of FIG. 7 by mitigating or removing at least one of perspective distortion or lens distortion. Because perspective distortion or lens distortion can be reduced, compensated for, or removed by applying a bird's-eye-view transform or rectifying the runtime image 700, vehicle localization may be more accurately determined when using features from the rectified runtime image 800, such as aspects associated with a rectified view of one or more runtime road markings, such as a first railroad crossing road marking 810, a second railroad crossing road marking 820, or a speed limit road marking 830 (not visible or labeled in FIG. 7).

In one or more embodiments, an image processing component can be configured to transform the runtime image into a rectified runtime image by reducing perspective distortion associated with the runtime image, where the rectified runtime image includes a rectified view of the one or more runtime road markings, such as 810, 820, and 830. As an example, the image processing component can be configured to achieve this by performing an inverse perspective transform on the runtime image, similarly to FIG. 2. As a result of the rectification or the inverse perspective transform, perspective distortion associated with the runtime image can be mitigated or removed. Additionally, a gyroscope component can be configured to measure a tilt angle of a ground plane associated with the vehicle. Here, the image processing component can be configured to transform the runtime image into the rectified runtime image based on the tilt angle of the ground plane. When a vehicle is on a hill where the tilt angle of the ground plane is not zero, for example, a runtime image or a rectified runtime image can be adjusted to compensate for the hill based on the tilt angle measured by the gyroscope component.

Figure 9:
FIG. 9 is an illustration of an example boosted rectified runtime image of a navigation environment, according to one or more embodiments.

FIG. 9 is an illustration of an example boosted rectified runtime image 900 of a navigation environment, according to one or more embodiments. FIG. 9 is similar to FIG. 8, except that shadow boosting was performed on the rectified runtime image 800 to generate the boosted rectified runtime image (boosted image) 900 of FIG. 9. Generally, shadow boosting 'evens out' shadow effects on substantially white colored objects or road markings, for example. In other words, if a first portion of an object, such as a road marking, is not covered by a shadow, and a second portion of the object is covered by the shadow, shadow boosting generally compensates for or mitigates the effect of the shadow on the second portion of the object or on objects covered by shadows. This boosting enables image enhancement to efficiently extract road markings or road marking regions. FIG. 9 includes one or more boosted rectified runtime road markings 910, 920, and 930. For example, because the rectified runtime image 800 of FIG. 8 can be shadow boosted, one or more of the runtime road markings 810, 820, and 830 from FIG. 8 are boosted, as seen at 910, 920, and 930.

In one or more embodiments, a shadow component, such as the shadow component 1412 as will be discussed in FIG. 14, can be configured to equalize a blue spectrum across the rectified view of the one or more runtime road markings within the rectified runtime image. Generally an amount of blue is greater in a shadowed region of an image than a non-shadowed region of the image. This is because shadowed regions are lit up by scattered light from the sky, which is more in the blue spectrum. As an example, if an object or road marking is white, shadowing will generally make the object or road marking appear bluer in comparison to other white objects or road markings within an image. By equalizing the blue spectrum across regions of interest, such as a road marking region, road marking, etc., the amount of blue in the shadowed region can be reduced, thereby 'boosting' the brightness of the shadowed region closer to a brightness of the non-shadowed region. In one or more embodiments, shadow boosting is performed on white colored road markings or substantially white road markings.

Figure 10:
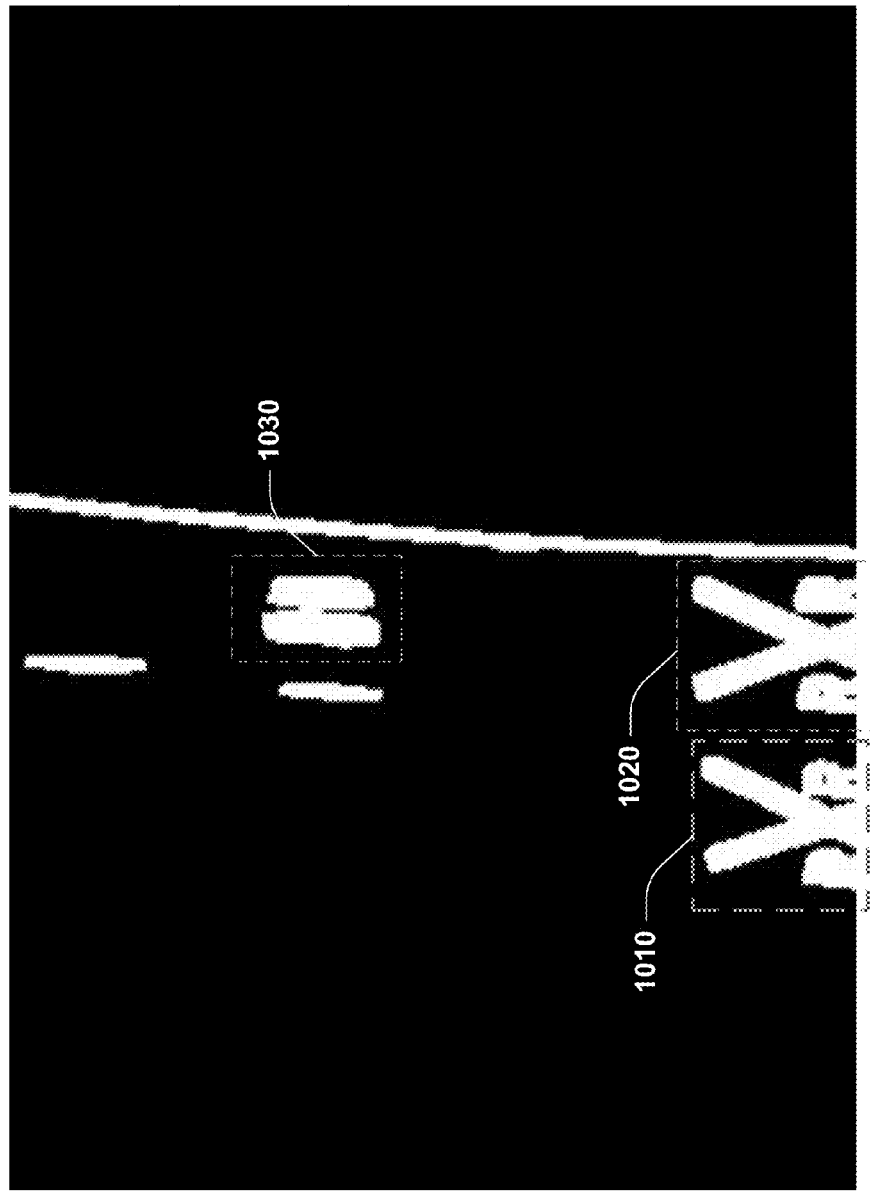
FIG. 10 is an illustration of an example enhanced rectified runtime image of a navigation environment, according to one or more embodiments.

FIG. 10 is an illustration of an example enhanced rectified runtime image 1000 of a navigation environment, according to one or more embodiments. The enhanced rectified runtime image 1000 includes a first enhanced runtime road marking region 1010, a second enhanced runtime road marking region 1020, and a third enhanced runtime road marking region 1030. Additionally, the enhanced rectified runtime image 1000 can include one or more other regions that are not road markings, but these other regions can be filtered using structural matching, as will be described herein. In one or more embodiments, an image processing component can be configured to enhance a rectified runtime image or a boosted image by extracting one or more enhanced runtime road marking regions from the rectified runtime image or the boosted image. For example, the image processing component can be configured to extract one or more enhanced runtime road marking regions based on a maximally stable external region (MSER) algorithm. In other words, the image processing component can be configured to enhance the rectified runtime image based on an intensity of the rectified runtime image. Effectively, the enhanced rectified runtime image 1000 of FIG. 10 highlights or boosts a brightness of the rectified runtime image 800 of FIG. 8 or 900 of FIG. 9 in a binary fashion, thereby providing a black and white image. Due to its binary nature, the enhanced rectified runtime image 1000 can be used for efficient corner detection, as will be described in FIG. 11.

Figure 11:
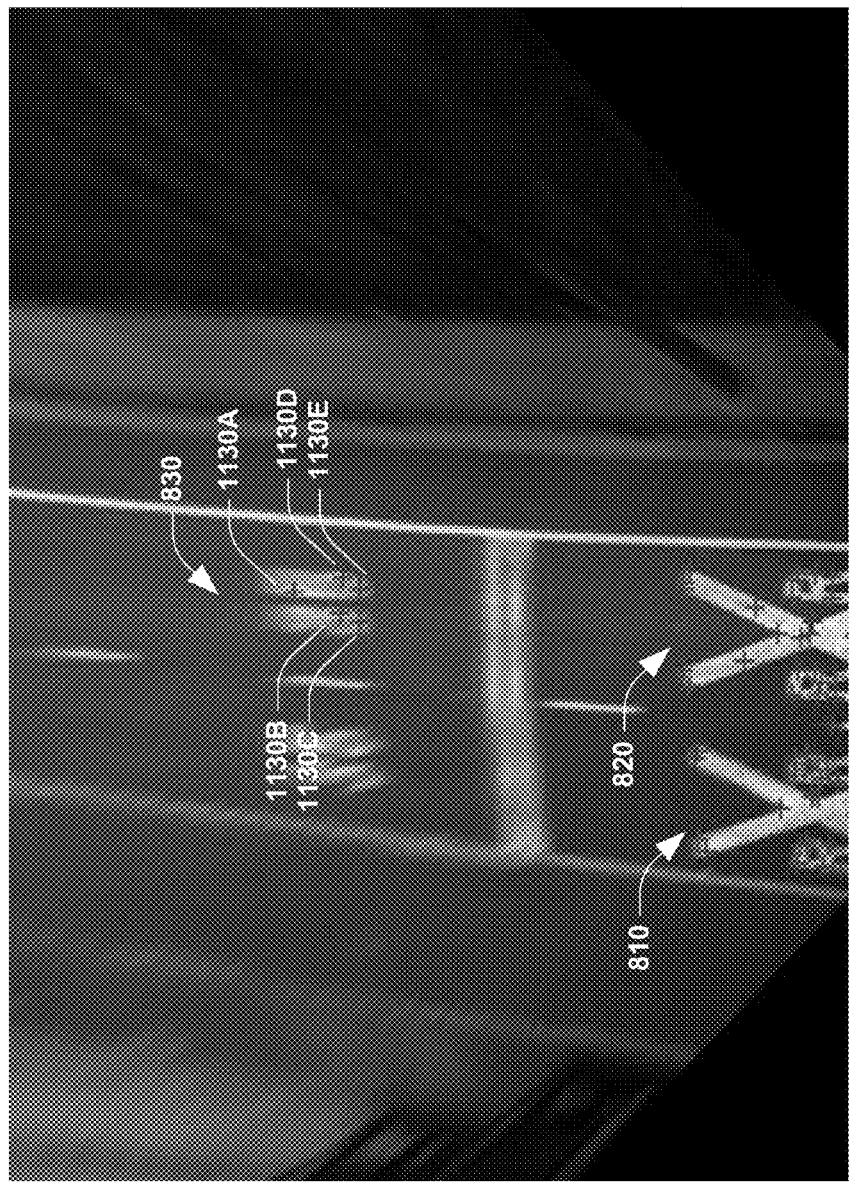
FIG. 11 is an illustration of example corners within a rectified runtime image of a navigation environment, according to one or more embodiments.

FIG. 11 is an illustration of example runtime corners detected within a rectified runtime image 1100 of a navigation environment, according to one or more embodiments. One or more runtime corners can be calculated, determined, computed, or detected for a road marking region, enhanced runtime road marking region, etc. For example, runtime corners 1130A, 1130B, 1130C, 1130D, and 1130E can be detected for the speed limit road marking 830 based on the road marking region 1030 of FIG. 10. In one or more embodiments, a corner component can be configured to calculate one or more runtime corners for one or more runtime road markings based on one or more enhanced runtime road marking regions, such as 1010, 1020, or 1030 of FIG. 10. A pixel location can be calculated for a runtime corner. In one or more embodiments, one or more runtime corners can be calculated based on features from accelerated segment test (FAST) corner detection. Similarly to creation of a template or the template database, a HOG descriptor can be calculated for a runtime corner. For example, the HOG descriptor can be calculated based on a patch of pixels, where a pixel of the patch of pixels includes the runtime corner. In one or more embodiments, the corner component can be configured to calculate the HOG descriptor for a runtime corner.

A matching component, such as the matching component 1408 as will be discussed in FIG. 14, can be configured to match one or more runtime corners with one or more template corners from one or more templates, such as templates from a template database. A template from the template database can be feature based or corner based. As an example, the matching can include at least one of putative matching or structural matching. Generally, putative matching can include matching a runtime corner against one or more template corners from one or more templates based on features, descriptors, pixel location, etc. For example, putative matching can include matching according a HOG descriptor from a template corner versus a HOG descriptor from a runtime corner. In one or more embodiments, putative matching is based on a threshold. Additionally, structural matching can include matching (runtime corners and template corners) based on at least one of a shape of a set of one or more corners, a 2D geometry of a road marking, a pattern of a set of one or more corners, pixel locations of corners, etc.

The matching component can be configured to classify one or more runtime corners based on one or more templates and match one or more runtime corners based on the classification. As an example, a runtime corner classified as a railroad crossing corner can be matched against template corners labeled as railroad crossings. Examples of road marking types or road marking classifications can include stop, bike lane, turn arrows, railroad, lane markings, crosswalks, etc. Feature based matching is generally more accurate than other types of matching, such as whole shape matching or glyph matching, because missing or undetected features or corners can be inferred, such as with a snake algorithm. For example, if a portion of a glyph is missing or undetected, glyph matching may not be feasible. Conversely, when one or more corners are not detected, the snake algorithm can 'fill in' the missing corners. For example, the snake algorithm can iteratively find locations for corners based on minimizing an energy function and locking onto a suitable contour. As an example, a contour can be found by a road marking contrasted against an illuminated background, provided by image enhancement. The matching component can be configured to determine one or more additional (e.g., 'missing') runtime corners based on one or more template corners, such as by filling in blanks or inferring corners using corresponding template corners. In one or more embodiments, one or more additional runtime corners can be determined based on a snake algorithm. When 'missing' corners are found, template corners from a matching or corresponding template can be substituted based on a contour of a road marking.

In one or more scenarios, a GPS component can be configured to receive or determine a supplemental location of the vehicle. In these scenarios, the matching component can be configured to match corners based on the supplemental location of the vehicle, such as within a radius of the supplemental location. For example, template corners within a radius of the supplemental location can be used for matching against the corners calculated at runtime (runtime corners). By using the supplemental location to facilitate a search or a match, localization can be performed more quickly. In one or more embodiments, the supplemental location can be determined based on at least one of a GPS location, by a camera, mono camera, stereo camera, triangulation, etc.

A localization component, such as the localization component 1410 as will be discussed in FIG. 14, can be configured to determine at least one of a location of the vehicle or a pose of the vehicle based on the match. As an example, one or more additional runtime corners can be used to facilitate matching for the localization component. In one or more embodiments, the localization component can be configured to determine the location or the pose of the vehicle based on a linear transform on a bird's-eye-view of an image (e.g., a rectified image, inverse perspective mapped image, inverse perspective transform image, etc.), a corner location (e.g., a pixel location of a road marking) based on a pixel coordinate system matched between a rectified training image and a rectified runtime image, GPS locations of corners from the rectified training image, a pixel location of a road marking detection component or a pixel location of a camera from the rectified runtime image. It will be appreciated that, because images associated with FIG. 1-FIG. 4 can be derived from one another, that a feature based on one of the images can be based on one or more associated images. Similarly, because images associated with FIG. 7-FIG. 11 can be derived from one another, that a feature based on one of the images can be based on one or more associated images. For example, a pixel location of a camera can be determined based on at least one of the rectified runtime image 800 of FIG. 8, the boosted image 900 of FIG. 9, the enhanced rectified runtime image 1000 of FIG. 10, or the rectified runtime image 1100 of FIG. 11, etc. Because the pixel location of the camera can be determined or is otherwise known, the pose or bearing of the vehicle can be determined. In other words, a runtime image and a training image are used to map a first coordinate system (e.g., pixel coordinate system) to a second coordinate system (e.g., GPS coordinate system) and solve for a GPS coordinate of a camera.

In one or more embodiments, the localization component can be configured to determine the location or the pose of the vehicle based on at least one of triangulation, a perspective-n-point pose of one or more road marking detection components, stereo based triangulation, local bundle adjustment, etc. The perspective-n-point pose can be calculated from known 3D to 2D point correspondences, for example.

Figure 12:
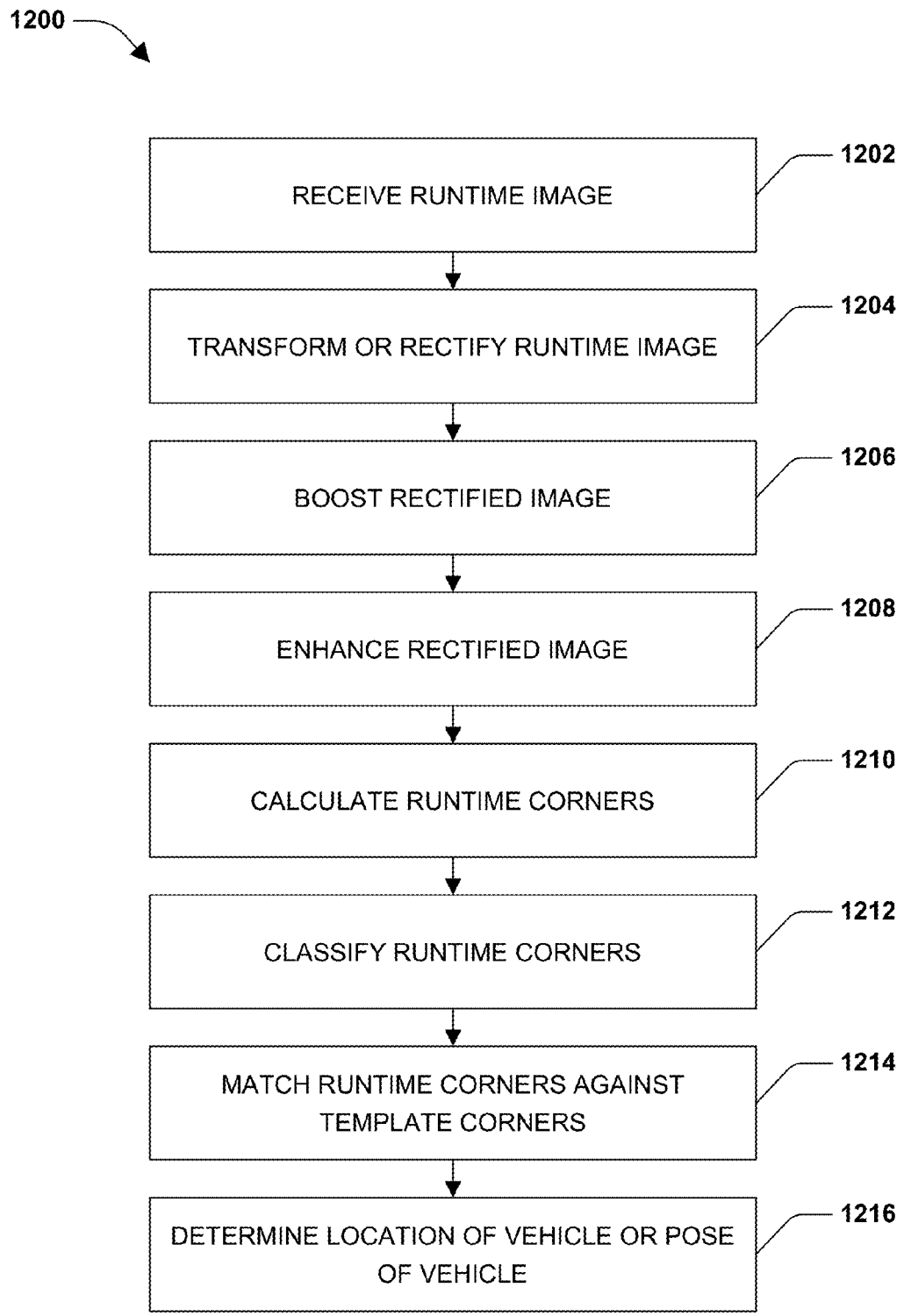
FIG. 12 is an illustration of an example flow diagram of a method for vehicle localization, according to one or more embodiments.

FIG. 12 is a flow diagram of a method 1200 for vehicle localization, according to one or more embodiments. At 1202, a runtime image can be received or captured. The runtime image can be of a navigation environment associated with a perspective from a vehicle and include one or more runtime road markings. At 1204, the runtime image can be transformed or rectified into a rectified runtime image. The transformation can be a bird's-eye-view transform which reduces perspective distortion associated with the runtime image. The rectified runtime image can include a rectified view of the one or more runtime road markings. At 1206, the rectified runtime image can be boosted to generate a boosted image. For example, shadow boosting can be performed on the rectified runtime image by equalizing a blue spectrum across the rectified view of the one or more runtime road markings within the rectified runtime image. At 1208, the boosted image or the rectified runtime image can be enhanced. For example, one or more enhanced runtime road marking regions can be extracted based on an MSER algorithm. At 1210, one or more runtime corners can be calculated, computed, determined, etc. for one or more runtime road markings or one or more enhanced runtime road marking regions. At 1212, one or more of the runtime corners can be classified. The classification can be based on a road marking type for one or more runtime road markings. At 1214, one or more runtime corners can be matched against one or more template corners of a template from a template database. At 1216, a location of a vehicle or a pose of a vehicle can be determined, such as based on the match. In one or more embodiments, the template database can be updated with one or more runtime corners that were detected, but not matched with template corners from the template database. For example, if a template database is created based on a set of one or more road markings, but additional road markings are painted on, placed upon, or added at a later time, the additional road markings detected by a runtime user capturing runtime images or associated corners, etc. can be added to the database. In one or more embodiments, when a threshold is met, such as a number of times a road marking or one or more associated corners are detected, but not in the template database, one or more associated corners can be added to a corresponding template within the template database. Further, one or more of these corners can be designated as added by a runtime user, rather than from a training image, for example.

Figure 13:
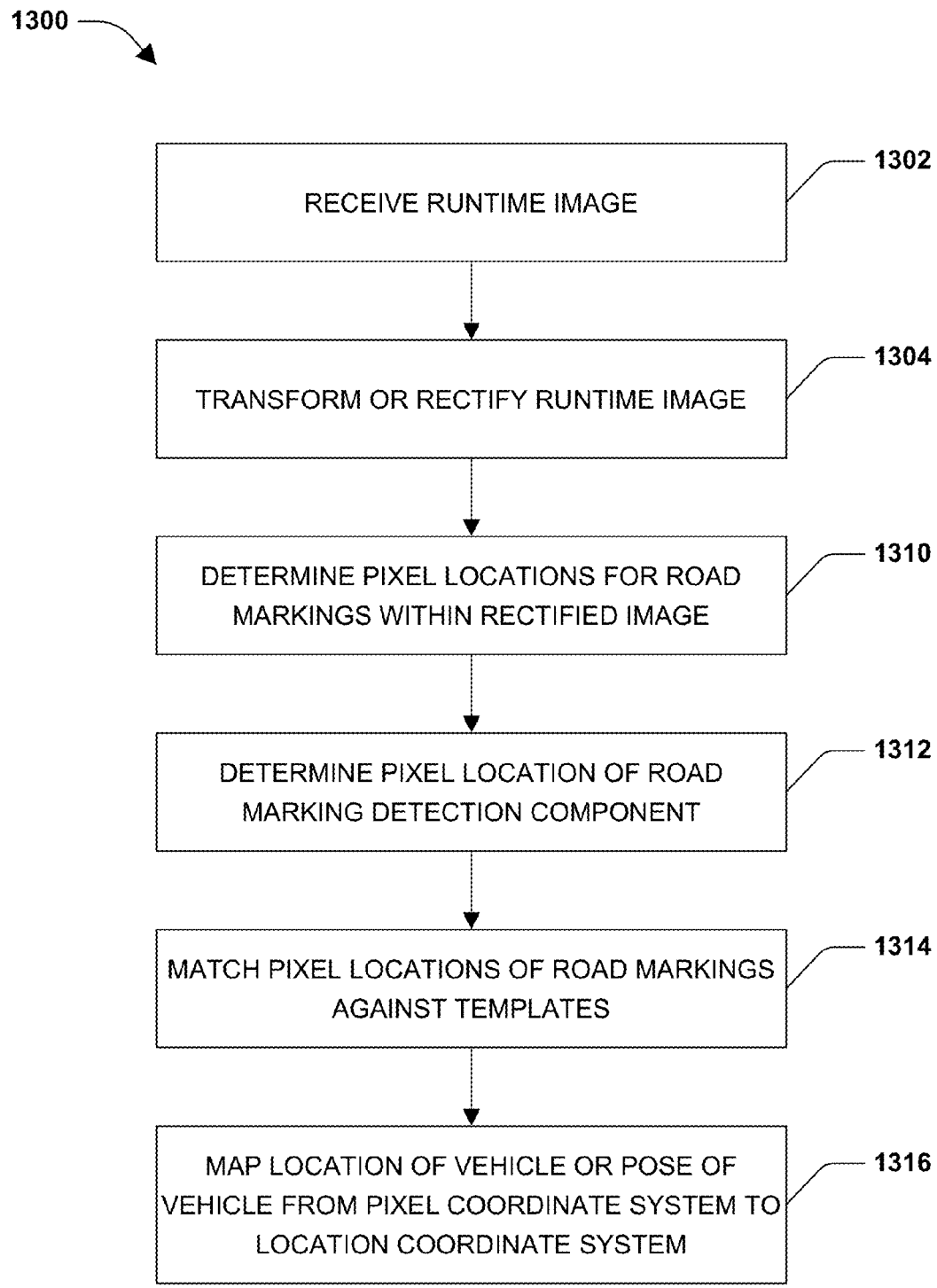
FIG. 13 is an illustration of an example flow diagram of a method for vehicle localization, according to one or more embodiments.

FIG. 13 is a flow diagram of a method 1300 for vehicle localization, according to one or more embodiments. At 1302, a runtime image can be received. At 1304, the runtime image can be transformed or rectified into a rectified runtime image. At 1310, one or more pixel locations can be determined for one or more runtime road markings within the rectified runtime image. At 1312, a pixel location can be determined for a road marking detection component of a vehicle. At 1314, pixel locations for one or more runtime road markings can be matched against pixel location of road marking of one or more templates. At 1316, a location of a vehicle or a pose of a vehicle can be mapped from a pixel coordinate system to a location coordinate system.

In one or more embodiments, navigation instructions can be provided to a runtime user based on the location of the vehicle, the pose of the vehicle, one or more of the road markings detected at runtime, etc. For example, if a vehicle is travelling the wrong way on a road, the image capture component or camera may capture an image including an upside down arrow. Upon detection of the upside down arrow, navigation instructions can be provided to the runtime user to move to a correct lane, etc. for example. In one or more embodiments, navigation instructions are provided to a runtime user based on a shape of a captured road marking. For example, when a road marking is associated with a turn only lane, navigation instructions can be provided to the runtime user to turn based on the turn only road marking.

Figure 14:
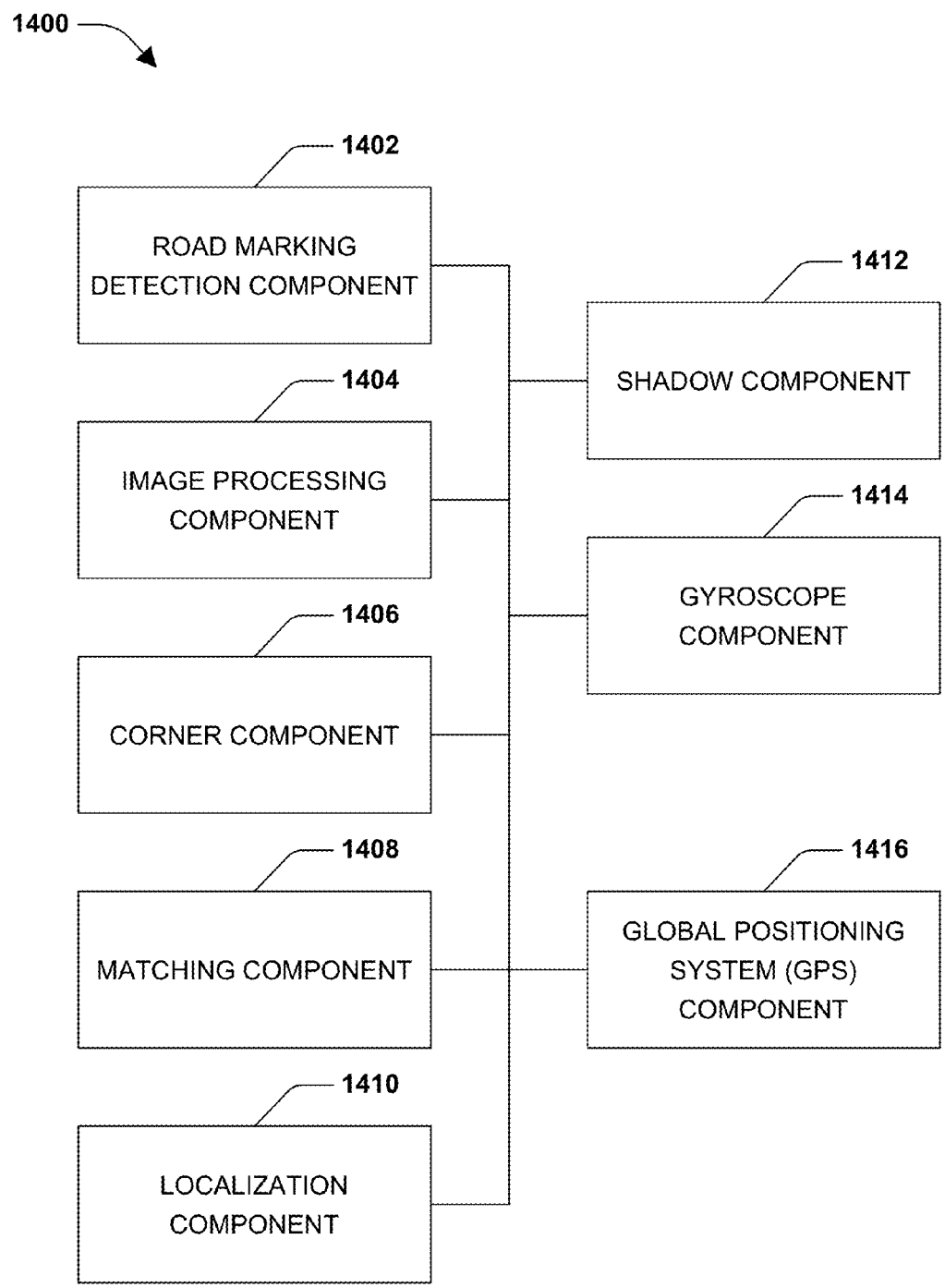
FIG. 14 is an illustration of an example component diagram of a system for vehicle localization, according to one or more embodiments.

FIG. 14 is a component diagram of a system 1400 for vehicle localization, according to one or more embodiments. In one or more embodiments, a road marking detection component 1402 can be configured to receive a runtime image of a navigation environment associated with a perspective from a vehicle, where the runtime image can include one or more runtime road markings. An image processing component 1404 can be configured to transform the runtime image into a rectified runtime image by reducing perspective distortion associated with the runtime image, where the rectified runtime image can include a rectified view of the one or more runtime road markings. The image processing component 1404 can be configured to enhance the rectified runtime image by extracting one or more enhanced runtime road marking regions from the rectified runtime image. A corner component 1406 can be configured to calculate one or more runtime corners for one or more runtime road markings based on one or more enhanced runtime road marking regions. A matching component 1408 can be configured to match one or more runtime corners with one or more template corners from one or more templates. A localization component 1410 can be configured to determine at least one of a location of the vehicle or a pose of the vehicle based on the match. A shadow component 1412 can be configured to equalize a blue spectrum across the rectified view of the one or more runtime road markings within the rectified runtime image. A gyroscope component 1414 can be configured to measure a tilt angle of a ground plane associated with the vehicle. Additionally, the image processing component 1404 can be configured to transform the runtime image into the rectified runtime image based on the tilt angle of the ground plane. A global positioning system (GPS) component 1416 can be configured to receive a supplemental location of the vehicle. The matching component 1408 can be configured to match based on the supplemental location of the vehicle.

It will be appreciated that at least one or more of the components of the system 1400 of FIG. 14 can be implemented as the same or corresponding component as one or more of the components from the system 600 of FIG. 6, according to one or more embodiments. For example, the road marking detection component 602 of FIG. 6 can be implemented as the same component as the road marking detection component 1402 of FIG. 14. In other embodiments, respective components can be implemented as separate components. For example, the road marking detection component 602 of FIG. 6 can be implemented as a different component from the road marking detection component 1402 of FIG. 14.

Figure 15:
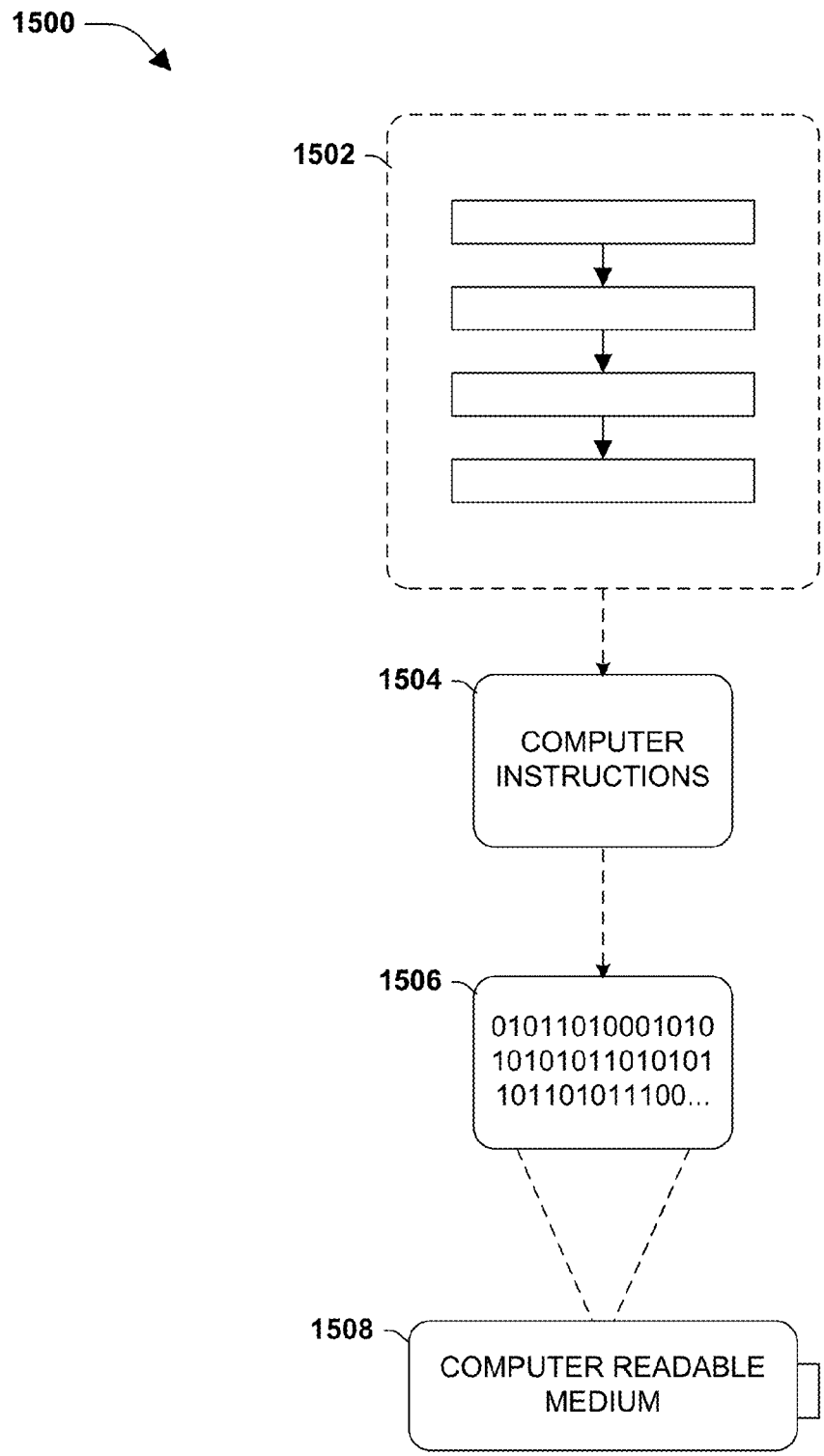
FIG. 15 is an illustration of a computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device that is devised in these ways is illustrated in FIG. 15, wherein an implementation 1500 includes a computer-readable medium 1508, such as a CD-R, DVD-R, flash drive, a platter of a hard disk drive, etc., on which is encoded computer-readable data 1506. This computer-readable data 1506, such as binary data including a plurality of zero's and one's as shown in 1506, in turn includes a set of computer instructions 1504 configured to operate according to one or more of the principles set forth herein. In one such embodiment 1500, the processor-executable computer instructions 1504 is configured to perform a method 1502, such as the method 500 of FIG. 5, method 1200 of FIG. 12, or method 1300 of FIG. 13. In another embodiment, the processor-executable instructions 1504 are configured to implement a system, such as the system 600 of FIG. 6 or system 1400 of FIG. 14. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 16:
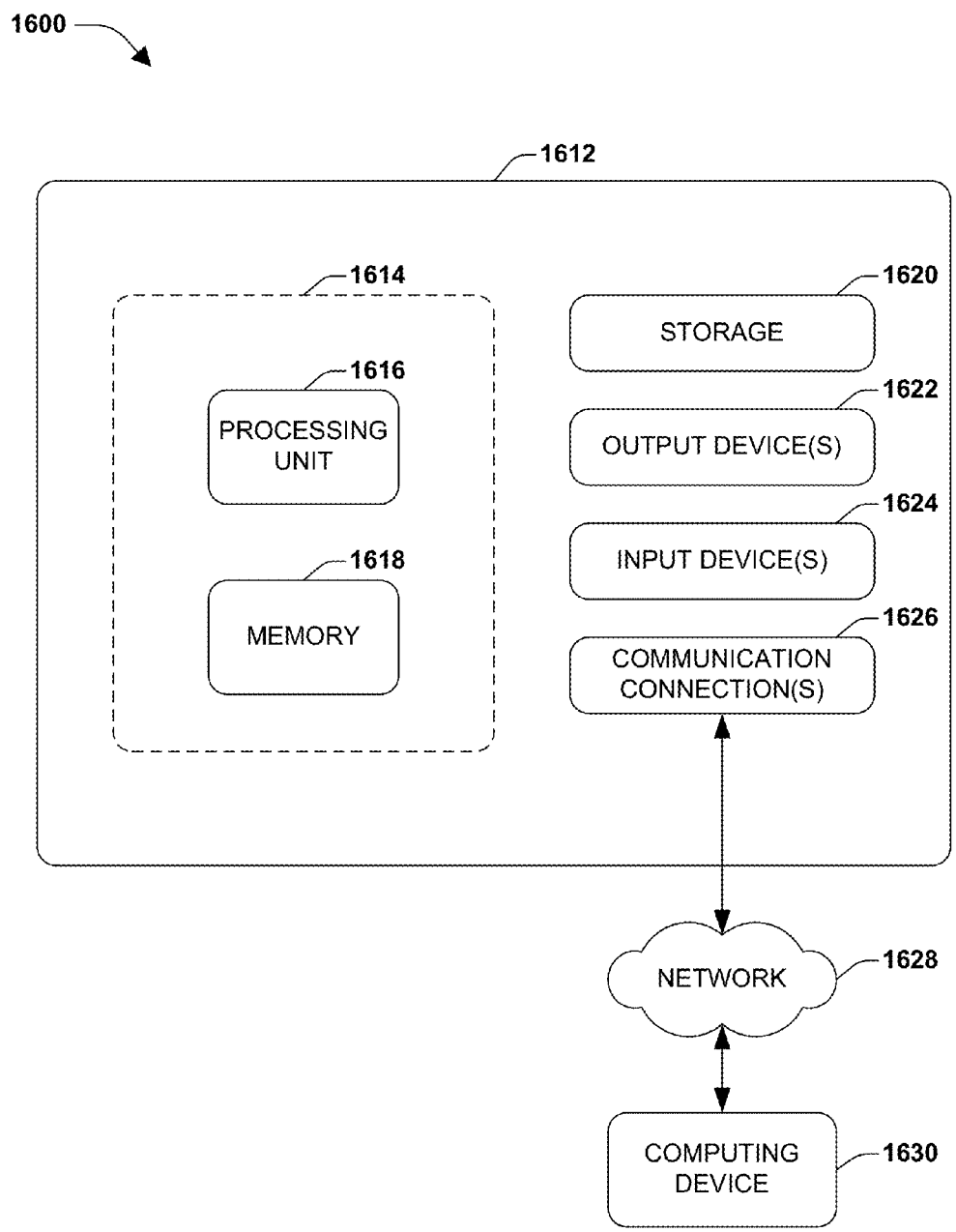
FIG. 16 is an illustration of a computing environment where one or more of the provisions set forth herein are implemented, according to one or more embodiments.

FIG. 16 and the following discussion provide a description of a suitable computing environment to implement embodiments of one or more of the provisions set forth herein. The operating environment of FIG. 16 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 16 illustrates a system 1600 including a computing device 1612 configured to implement one or more embodiments provided herein. In one configuration, computing device 1612 includes at least one processing unit 1616 and memory 1618. Depending on the exact configuration and type of computing device, memory 1618 may be volatile, such as RAM, non-volatile, such as ROM, flash memory, etc., or a combination of the two. This configuration is illustrated in FIG. 16 by dashed line 1614.

In other embodiments, device 1612 includes additional features or functionality. For example, device 1612 also includes additional storage such as removable storage or non-removable storage, including, but not limited to, magnetic storage, optical storage, and the like. Such additional storage is illustrated in FIG. 16 by storage 1620. In one or more embodiments, computer readable instructions to implement one or more embodiments provided herein are in storage 1620. Storage 1620 also stores other computer readable instructions to implement an operating system, an application program, and the like. Computer readable instructions are loaded in memory 1618 for execution by processing unit 1616, for example.

The term "computer readable media" as used herein includes computer storage media. Computer storage media includes volatile and nonvolatile, removable and non-removable media implemented in any method or technology for storage of information such as computer readable instructions or other data. Memory 1618 and storage 1620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1612. Any such computer storage media is part of device 1612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1612 includes input device(s) 1624 such as keyboard, mouse, pen, voice input device, touch input device, infrared cameras, video input devices, or any other input device. Output device(s) 1622 such as one or more displays, speakers, printers, or any other output device are also included in device 1612. Input device(s) 1624 and output device(s) 1622 are connected to device 1612 via a wired connection, wireless connection, or any combination thereof. In one or more embodiments, an input device or an output device from another computing device are used as input device(s) 1624 or output device(s) 1622 for computing device 1612. Device 1612 also includes communication connection(s) 1626 to facilitate communications with one or more other devices.

According to one or more aspects, a method for vehicle localization is provided, including receiving a runtime image of a navigation environment associated with a perspective from a vehicle. The runtime image can include one or more runtime road markings. The method can include transforming the runtime image into a rectified runtime image by reducing perspective distortion associated with the runtime image. The method can include transforming a runtime image of a navigation environment into a rectified runtime image, the rectified runtime image comprising a rectified view of one or more runtime road markings, the runtime image associated with a perspective from a vehicle. The rectified runtime image can include a rectified view of the one or more runtime road markings.

The method can include enhancing the rectified runtime image by extracting one or more enhanced runtime road marking regions from the rectified runtime image. The method can include calculating one or more runtime corners for one or more runtime road markings based on one or more enhanced runtime road marking regions. The method can include calculating one or more runtime corners for the one or more runtime road markings based on one or more enhanced runtime road marking regions derived from the rectified runtime image. The method can include matching one or more runtime corners with one or more template corners from one or more templates. The method can include determining at least one of a location of the vehicle or a pose of the vehicle based on the matching. The method can include determining at least one of a location of the vehicle or a pose of the vehicle based on matching the one or more runtime corners with one or more template corners from one or more templates.

In one or more embodiments, the method can include at least one of performing an inverse perspective transform on the runtime image, performing shadow boosting on at least a portion of the rectified runtime image by equalizing a blue spectrum across the rectified view of the one or more runtime road markings within the rectified runtime image, extracting one or more enhanced runtime road marking regions based on a maximally stable external region (MSER) algorithm, enhancing the rectified runtime image based on an intensity of the rectified runtime image, calculating one or more runtime corners based on features from accelerated segment test (FAST) corner detection, determining a supplemental location of the vehicle, matching one or more runtime corners based on the supplemental location of the vehicle, classifying one or more runtime corners based on one or more templates, matching one or more runtime corners based on the classification, putative matching, structural matching, determining one or more additional runtime corners based on one or more template corners, determining at least one of the location of the vehicle or the pose of the vehicle based on one or more additional runtime corners, determining one or more additional runtime corners based on a snake algorithm, receiving a tilt angle of a ground plane associated with the vehicle, or transforming the runtime image into the rectified runtime image based on the tilt angle of the ground plane.

According to one or more aspects, a system for vehicle localization is provided, including a road marking detection component which can be configured to receive a runtime image of a navigation environment associated with a perspective from a vehicle, the runtime image including one or more runtime road markings. The system can include an image processing component configured to transform the runtime image into a rectified runtime image by reducing perspective distortion associated with the runtime image, the rectified runtime image including a rectified view of the one or more runtime road markings. The image processing component can be configured to enhance the rectified runtime image by extracting one or more enhanced runtime road marking regions from the rectified runtime image. The system can include a corner component configured to calculate one or more runtime corners for one or more runtime road markings based on one or more enhanced runtime road marking regions. The system can include a matching component configured to match one or more runtime corners with one or more template corners from one or more templates. The system can include a localization component configured to determine at least one of a location of the vehicle or a pose of the vehicle based on the match.

In one or more embodiments the system can include at least one of a shadow component configured to equalize a blue spectrum across the rectified view of the one or more runtime road markings within the rectified runtime image, a global positioning system (GPS) component configured to receive a supplemental location of the vehicle, the matching component configured to match based on the supplemental location of the vehicle, or a gyroscope component configured to measure a tilt angle of a ground plane associated with the vehicle, where the image processing component can be configured to transform the runtime image into the rectified runtime image based on the tilt angle of the ground plane.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, it will be understood that not all operations are necessarily present in each embodiment provided herein.

As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for vehicle localization, comprising:
   receiving a runtime image of a navigation environment associated with a perspective from a vehicle, wherein the runtime image comprises one or more runtime road markings;
   transforming the runtime image into a rectified runtime image by reducing perspective distortion associated with the runtime image, wherein the rectified runtime image comprises a rectified view of the one or more runtime road markings;
   enhancing the rectified runtime image by extracting one or more enhanced runtime road marking regions from the rectified runtime image;
   calculating one or more runtime corners for the one or more runtime road markings based on the one or more enhanced runtime road marking regions;
   matching the one or more runtime corners with one or more template corners from one or more templates, wherein each template corner has at least a Global Positioning System (GPS) location corresponding to a GPS coordinate system and a pixel location corresponding to a pixel coordinate system within at least one rectified training image associated with a template, and the matching is performed to determine a GPS coordinate for a camera capturing the runtime image based at least upon pixel locations and GPS locations of at least one matched template corner; and
   determining a location of the vehicle or a pose of the vehicle based on the matching,
   wherein the receiving, transforming, enhancing, calculating, matching, and determining is implemented via a processing unit.

2. The method of claim 1, wherein the transforming the runtime image comprises performing an inverse perspective transform on the runtime image.

3. The method of claim 1, further comprising performing shadow boosting on at least a portion of the rectified runtime image by at least equalizing a blue spectrum across the rectified view of the one or more runtime road markings within the rectified runtime image.

4. The method of claim 1, further comprising enhancing the rectified runtime image based on an intensity of the rectified runtime image.

5. The method of claim 1, further comprising calculating the one or more runtime corners based on features from accelerated segment test (FAST) corner detection.

6. The method of claim 1, further comprising:
determining a supplemental location of the vehicle; and
matching the one or more runtime corners based on the supplemental location of the vehicle.

7. The method of claim 1, further comprising:
classifying the one or more runtime corners based on the one or more templates; and
matching the one or more runtime corners to the one or more template corners based on the classification.

8. The method of claim 1, wherein the matching the one or more runtime corners to the one or more template corners comprises putative matching or structural matching.

9. The method of claim 1, further comprising:
determining the location of the vehicle or the pose of the vehicle based on the one or more additional runtime corners.

10. The method of claim 9, further comprising determining the one or more additional runtime corners based on a snake algorithm.

11. The method of claim 1, further comprising:
receiving a tilt angle of a ground plane associated with the vehicle; and
transforming the runtime image into the rectified runtime image based on the tilt angle of the ground plane.

12. A system for vehicle localization, comprising:
a road marking detection component configured to receive a runtime image of a navigation environment associated with a perspective from a vehicle, the runtime image comprises one or more runtime road markings;
an image processing component configured to:
transform the runtime image into a rectified runtime image by reducing perspective distortion associated with the runtime image, wherein the rectified runtime image comprises a rectified view of the one or more runtime road markings; and
enhance the rectified runtime image by extracting one or more enhanced runtime road marking regions from the rectified runtime image;
a corner component configured to calculate one or more runtime corners for the one or more runtime road markings based on the one or more enhanced runtime road marking regions;
a matching component configured to match the one or more runtime corners with one or more template corners from one or more templates to determine a GPS coordinate for a camera capturing the runtime image based at least upon pixel locations and GPS locations of at least one matched template corner, wherein each template corner has at least a Global Positioning System (GPS) location corresponding to a GPS coordinate system and a pixel location corresponding to a pixel coordinate system within at least one rectified training image associated with a template; and
a localization component configured to determine a location of the vehicle or a pose of the vehicle based on the match.

13. The system of claim 12, further comprising a shadow component configured to even out shadow effects on the one or more runtime road markings by equalizing a blue spectrum across the rectified view of the one or more runtime road markings within the rectified runtime image.

14. The system of claim 12, further comprising a global positioning system (GPS) component configured to receive a supplemental location of the vehicle, the matching component configured to match the one or more runtime corners with one or more template corners based on the supplemental location of the vehicle.

15. The system of claim 12, further comprising a gyroscope component configured to measure a tilt angle of a ground plane associated with the vehicle, the image processing component configured to transform the runtime image into the rectified runtime image based on the tilt angle of the ground plane.

16. A non-transitory computer-readable storage medium comprising computer executable instructions, which when executed via a processing unit on a computer performs acts, comprising:
transforming a runtime image of a navigation environment into a rectified runtime image, the rectified runtime image comprising a rectified view of one or more runtime road markings, the runtime image associated with a perspective from a vehicle;
mitigating an effect of a shadow on at least a portion of a runtime road marking of the one or more runtime road markings;
enhancing the rectified runtime image by extracting one or more enhanced runtime marking regions from the rectified runtime image;
calculating one or more runtime corners for the one or more runtime road markings based on the one or more enhanced runtime road marking regions derived from the rectified runtime image; and
determining at least one of a location of the vehicle or a pose of the vehicle based on matching the one or more runtime corners with one or more template corners from one or more templates, wherein each template corner has at least a Global Positioning System (GPS) location corresponding to a GPS coordinate system and a pixel location corresponding to a pixel coordinate system within at least one rectified training image associated with a template, and the matching is performed to determine a GPS coordinate for a camera capturing the runtime image based at least upon pixel locations and GPS locations of at least one matched template corner.

17. The non-transitory computer-readable storage medium of claim 16, wherein the transforming the runtime image comprises performing an inverse perspective transform on the runtime image.

18. The non-transitory computer-readable storage medium of claim 16, wherein the mitigating comprises performing shadow boosting on the rectified runtime image by equalizing a blue spectrum across the rectified view of the one or more runtime road markings within the rectified runtime image.

19. The non-transitory computer-readable storage medium of claim 16, further comprising calculating one or more runtime corners based on features from accelerated segment test (FAST) corner detection.

* * * * *